Figure 3:
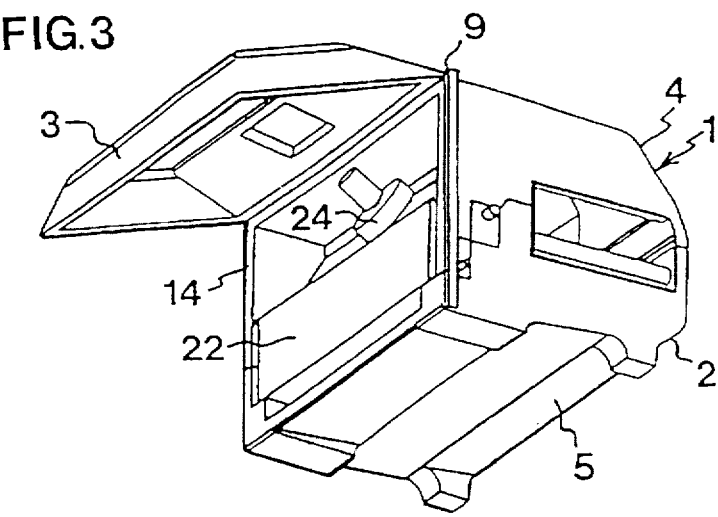

United States Patent [19]

Rothstein

[11] Patent Number: 5,797,278
[45] Date of Patent: Aug. 25, 1998

[54] AIR TREATMENT APPARATUS

[75] Inventor: Sven-Olle Rothstein, Ängelholm, Sweden

[73] Assignee: Frigoscandia Equipment AB, Helsingborg, Sweden

[21] Appl. No.: 894,524

[22] PCT Filed: Feb. 22, 1996

[86] PCT No.: PCT/SE96/00243

§ 371 Date: Aug. 21, 1997

§ 102(e) Date: Aug. 21, 1997

[87] PCT Pub. No.: WO96/26401

PCT Pub. Date: Aug. 29, 1996

[30] Foreign Application Priority Data

Feb. 23, 1995 [SE] Sweden ................. 9500688

[51] Int. Cl.$^6$ .................. F25D 25/04; A47B 96/04
[52] U.S. Cl. .................. 62/380; 62/266; 312/401; 312/236
[58] Field of Search .................. 62/63, 237, 266, 62/280, 404, 407; 312/31, 107, 400, 401, 236, 249.7

[56] References Cited

U.S. PATENT DOCUMENTS

| | | | |
|---|---|---|---|
| 3,841,109 | 10/1974 | Cann | 62/266 |
| 4,086,783 | 5/1978 | Wagner et al. | 62/374 |
| 4,580,413 | 4/1986 | Klee | 62/380 |
| 4,669,278 | 6/1987 | Lee, Jr. et al. | 62/380 |
| 5,222,363 | 6/1993 | Allen et al. | 62/380 |
| 5,365,572 | 11/1994 | Coffre | 62/374 |
| 5,415,013 | 5/1995 | Rothstein | 62/380 |

FOREIGN PATENT DOCUMENTS 0 623 793   11/1994   European Pat. Off. .

*Primary Examiner*—William Doerrler
*Attorney, Agent, or Firm*—Browdy and Neimark

[57] ABSTRACT

An air treatment apparatus comprises a housing (1) which has a casing made up of three elements (2–4), which are pivotable in relation to each other about shafts (9, 15) parallel to a longitudinal direction of an elongate trough provided in the housing. A lower element (2) supports the elongate trough, a heat-exchanging battery and a fan assembly. A rear element (3) forms a first side wall and is pivotable about an upper edge, so as to provide access to the heat-exchanging battery and the fan assembly from outside. An upper element (4) forms at least part of a second side wall and is pivotable in relation to the lower element, so as to provide access to the elongate trough from outside.

10 Claims, 3 Drawing Sheets

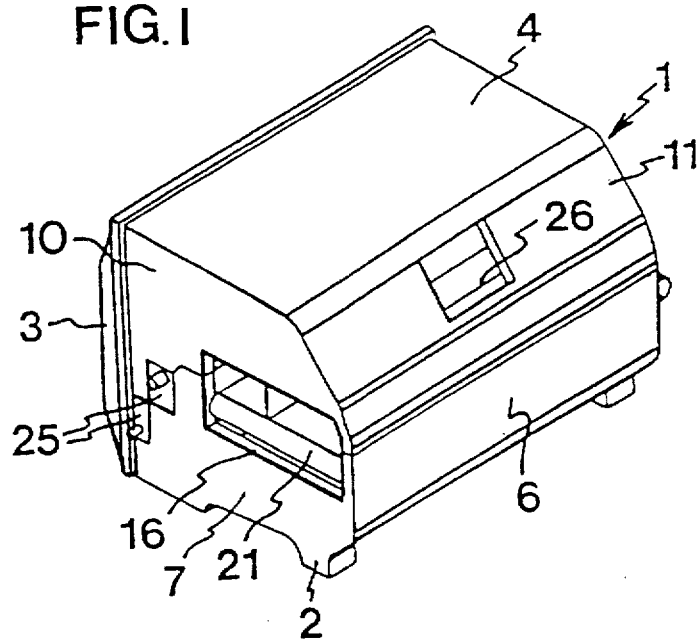
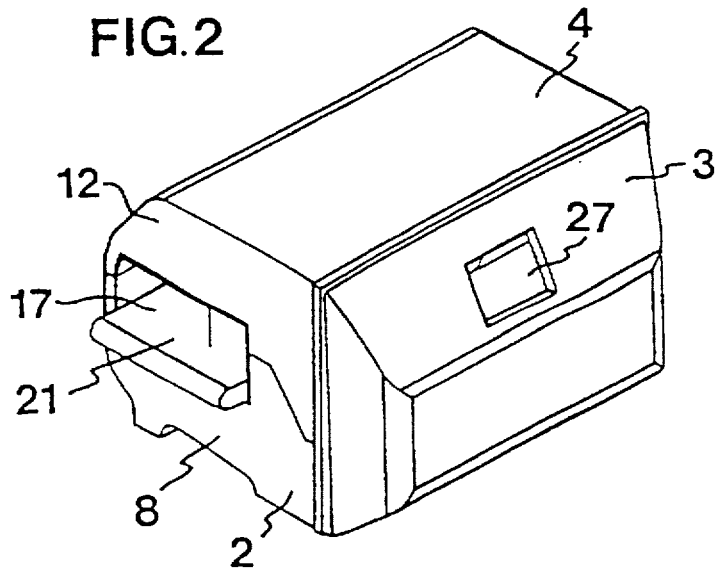

AIR TREATMENT APPARATUS

This invention generally relates to an air treatment apparatus and especially concerns such an apparatus as is intended for the refrigeration of food.

Conventional food-refrigerating plants using air for the refrigeration take up quite a lot of space. It is true that the size of the refrigerating plant can be considerably reduced by using e.g. liquid nitrogen instead of air as cooling agent, but this substantially increases the running expenses.

The object of this invention is, therefore, to provide a compact air treatment apparatus, which is of the type comprising a housing, which includes an elongate trough for receiving products that are to be air-treated, a heat-exchanging battery for conditioning the air used in the air treatment, and a fan assembly for generating an air flow which, for the purposes of the air treatment, circulates along a closed path that, apart from the fan assembly, extends up through the elongate trough and through the heat-exchanging battery.

According to the invention, this object is attained by an air treatment apparatus whose housing has a casing comprising three elements which are pivotable in relation to each other about axes parallel to a longitudinal direction of the elongate trough and which are made up of a one-piece lower element supporting the elongate trough, the heat-exchanging battery and the fan assembly, a one-piece rear element forming a first side wall and being pivotable about an upper edge so as to provide access to the heat-exchanging battery and the fan assembly from outside, as well as a one-piece upper element forming at least part of a second side wall and being pivotable in relation to the lower element so as to provide access to the elongate trough from outside.

By thus enabling direct access from outside to all the component parts of the air treatment apparatus, the space otherwise required therein for this purpose may be dispensed with in its entirety. As a result, the size of the air treatment apparatus may be considerably reduced, and the air treatment apparatus may thus be very compact, especially when the air treatment capacity is fairly restricted, thereby enabling, among other things, the apparatus to be transported in a standard-size container.

According to the invention, each of the three elements suitably consists of a double-walled plastic shell with an insulating filling. This enables a substantial reduction of the weight of the casing, which considerably facilitates the transport of the air treatment apparatus.

In a preferred embodiment, the upper element is pivotable about an axis at the bottom of the lower element. This position of the axis enables maximum access to the elongate trough as well as to the adjoining component parts of the closed path for the circulating air flow.

To likewise enable maximum access to the heat-exchanging battery and the fan assembly, the rear element is, in the preferred embodiment, pivotable about an axis at the top of the upper element.

By preferably having, in accordance with the invention, the heat-exchanging battery and the fan assembly form a first integral unit which can be mounted on the lower element, the mounting operation is much facilitated, i.e. the different units forming part of the air treatment apparatus need not be assembled on site in the housing, but may be assembled entirely outside the housing.

Likewise, a belt conveyor may suitably be mounted as an integral unit in the lower element, so as to form a for aminated bottom for the elongate trough.

Figure 4:
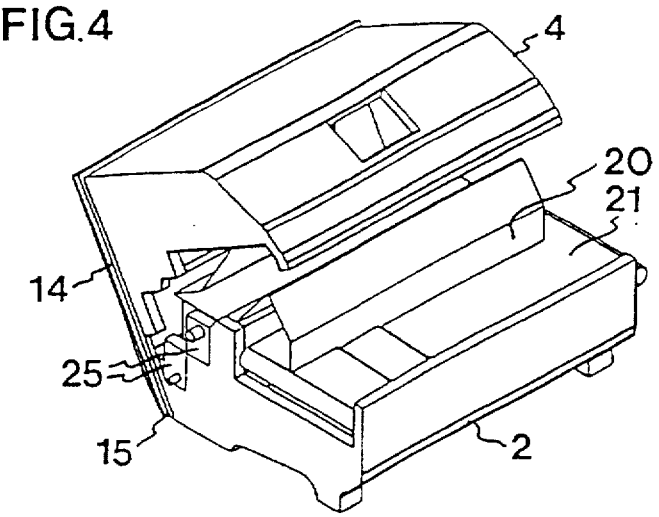
Figure 5:
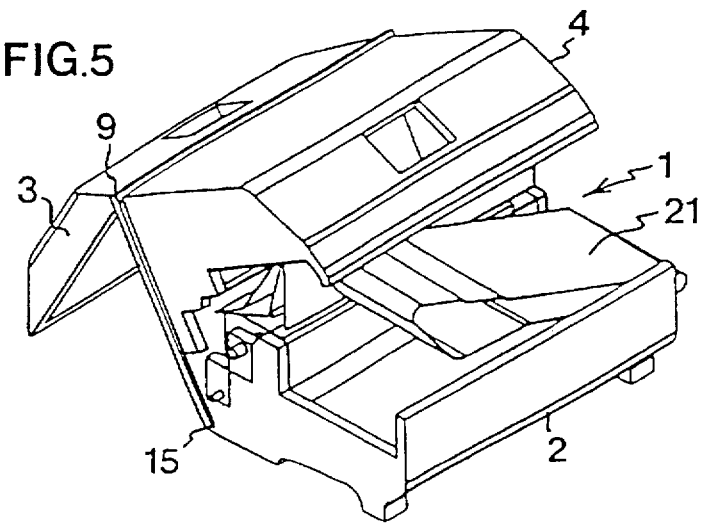
Figure 6:
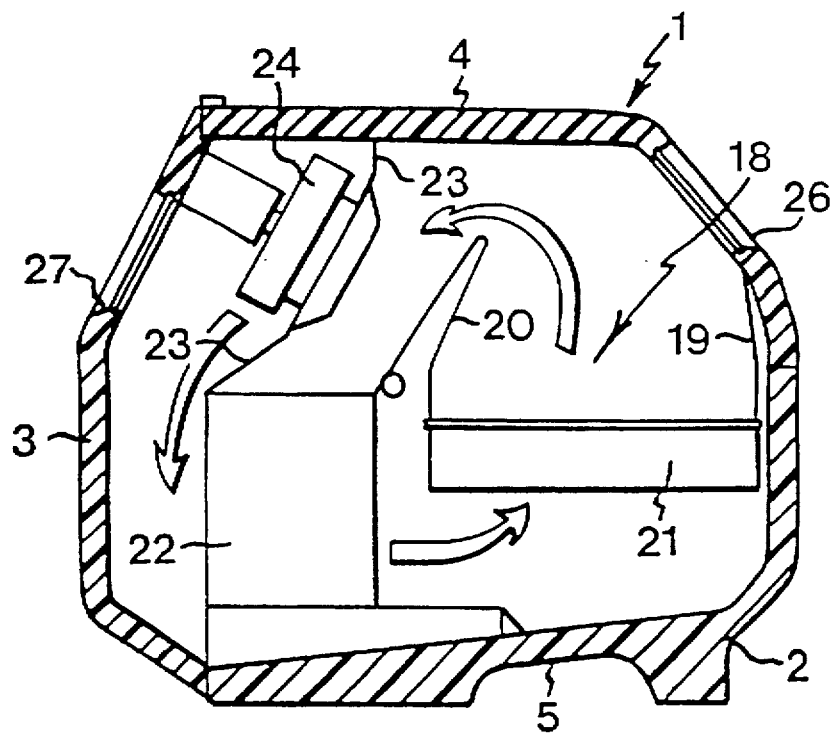

The invention will now be described in more detail with reference to the accompanying drawings, in which FIGS. 1 and 2 are perspective views of one embodiment of a refrigerating apparatus for food according to the invention, FIGS. 3–5 are perspective views of the refrigerating apparatus, showing the latter in various states of openness, FIG. 6 is a cross-section of the refrigerating apparatus of FIGS. 1–5, and FIG. 7 is a cross-section of another embodiment of the refrigerating apparatus according to the invention.

The refrigerating apparatus illustrated in FIGS. 1–6 comprises a housing 1 made up of three casing elements 2, 3 and 4. Each of these casing elements 2–4 is moulded in plastic, more specifically in the form of a double-walled plastic shell into which is afterwards introduced an insulating filling.

The casing element 2, which constitutes the lower element, is essentially in the shape of a bowl and includes the bottom 5 of the casing as well as the lower portions 6, 7 and 8 of the one side wall and the end walls of the casing.

The rear casing element 3 is dome-shaped and is so mounted as to be pivotable about a horizontal shaft 9 at its upper edge.

Finally, the upper casing element 4 is in the shape of a hood forming the top 10 of the casing as well as the upper portions 11, 12 and 13 of the one side wall and the two end walls of the casing. To be more specific, the upper, hood-like element 4 is mounted in a U-shaped element 14, which is located essentially in the vertical plane. The lower ends of the U-shaped element 14 are so mounted as to be pivotable about a horizontal shaft 15, and the U-shaped element 14 supports the pivot shaft 9 of the rear element 3 along its upper, horizontal part.

The end walls are provided with openings 16 and 17 for supplying and discharging products that are to be treated or have been treated in the apparatus. Between the openings 16 and 17, there is inside the air treatment apparatus provided an elongate trough 18 which is made up of side walls 19, 20 and a bottom in the form of a belt conveyor 21 comprising an endless, for aminated conveying belt. The side wall 20 of the trough may advantageously be adjustable in the lateral direction, to enable variation of the width of the trough 18. The belt conveyor 21 itself is designed as an integral unit, which can be completely assembled outside the refrigerating apparatus and then be put in place and mounted in the housing 1. Advantageously, the conveying belt is driven by means of a hydraulic motor, which is operated with the aid of an electrically-operated hydraulic pump.

A heat-exchanging battery 22 in the form of a cooling battery is formed integral with a partition 23 above, in which a fan assembly 24 is mounted. The integral unit 22–24 has essentially the same length and the same height as the interior of the housing 1 and can be completely assembled outside the refrigerating apparatus, so as to be mounted in assembled state on the lower element 2.

Moreover, the integral unit 22–24 has rectangular end plates 25 for pipe lead-ins to the cooling battery 22. These end plates form part of the end walls of the housing 1 and rest on correspondingly-shaped parts of the lower portions 7, 8 of the end walls of the lower element 2. Thus, the cooling battery 22 is intended to be connected, via the pipe lead-ins in the end plates 25, to an external refrigerating machine.

In the normal position of operation of the refrigerating apparatus, which is illustrated in FIGS. 1, 2 and 6, the rear element 3 and the upper element 4 are both closed, the upper edge of the partition 23 sealing against the underside of the upper element 4. The fan 24, which suitably also is operated with the aid of a hydraulic motor, will generate an air flow circulating along a closed path indicated by arrows in FIG.

6. The air treatment of the products inside the refrigerating apparatus may then be observed through a window 26 provided in the side-wall portion 11 of the upper element. A similar window 27 is provided in the rear element 3, thus enabling monitoring of the fan 24 as well as the inlet side of the cooling battery 22.

Figure 7:
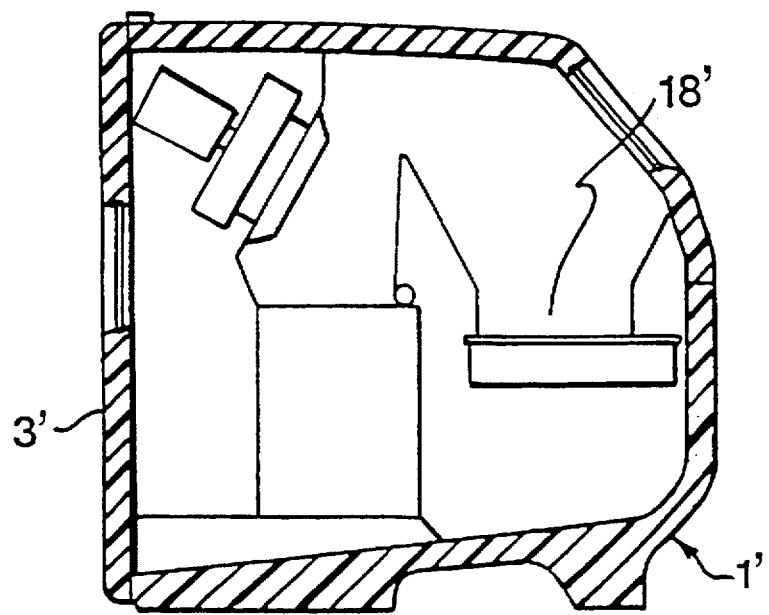

The embodiment illustrated in FIG. 7 differs from the embodiment described above in having a narrower trough 18', enabling a narrower housing 1' as well as a flat rear element 3'.

It goes without saying that several modifications of the refrigerating apparatus described above are conceivable within the scope of the invention as defined in the appended claims.

I claim:

1. An air treatment apparatus comprising a housing (1), which includes an elongate trough (18) for receiving products that are to be air-treated, a heat-exchanging battery (22) for conditioning the air used in the air treatment, and a fan assembly (24) for generating an air flow which, for the purposes of the air treatment, circulates along a closed path that, apart from the fan assembly, extends up through the elongate trough and through the heat-exchanging battery, characterised in that the housing (1) has a casing comprising three elements (2–4) which are pivotable in relation to each other about axes (9, 15) parallel to a longitudinal direction of the elongate trough (18) and which are made up of a one-piece lower element (2) supporting the elongate trough, the heat-exchanging battery (22) and the fan assembly (24), a one-piece rear element (3) forming a first side wall and being pivotable about an upper edge so as to provide access to the heat-exchanging battery and the fan assembly from outside, as well as a one-piece upper element (4) forming at least part (11) of a second side wall and being pivotable in relation to the lower element so as to provide access to the elongate trough from outside.

2. An air treatment apparatus as set forth in claim 1, characterised in that each of the three elements (2–4) consists of a double-walled plastic shell with an insulating filling.

3. An air treatment apparatus as set forth in claim 1, characterised in that the upper element (4) is pivotable about an axis (15) at the bottom (5) of the lower element (2).

4. An air treatment apparatus as set forth in claim 1, characterised in that the rear element (3) is pivotable about an axis (9) at the top of the upper element (4).

5. An air treatment apparatus as set forth in claim 1, characterised in that the heat-exchanging battery (22) and the fan assembly (24) form a first integral unit (22–24), which can be mounted on the lower element (2).

6. An air treatment apparatus as set forth in claim 5, characterised in that the first integral unit (22–24) has end plates (25) forming part of the end walls (7, 12; 8, 13) of the housing (1).

7. An air treatment apparatus as set forth in claim 1, characterised in that there is provided a belt conveyor (21) which, as an integral unit, can be mounted in the lower element (2), so as to form a for aminated bottom for the elongate trough (18).

8. An air treatment apparatus as set forth in claim 1, characterised in that there is provided a vertically disposed U-shaped element (14) to which the upper element (4) is fixedly connected and which at the bottom is pivotally mounted on the lower element (2) and at an upper edge pivotally supports the rear element (3).

9. An air treatment apparatus as set forth in claim 1, characterised in that the upper element (4) and the rear element (3) each have a window (26, 27) for direct observation of respectively the interior of the elongate trough (18) and one side of the fan assembly (24) and the heat-exchanging battery (22).

10. An air treatment apparatus as set forth in of claim 1, characterised in that there are provided conduits extending from the housing (1) and adapted to connect the heat-exchanging battery (22) to an external refrigerating machine.

* * * * *